United States Patent [19]

Simington

[11] 4,254,673

[45] Mar. 10, 1981

[54] SAW MOUNTED SAW CHAIN SHARPENER

[75] Inventor: Jack F. Simington, Chiloquin, Oreg.

[73] Assignee: Simington Products Co., Chiloquin, Oreg.

[21] Appl. No.: 43,237

[22] Filed: May 29, 1979

[51] Int. Cl.³ .............................................. B23D 63/16
[52] U.S. Cl. ........................................ 76/25 A; 76/42
[58] Field of Search .................... 76/25 A, 40, 41, 42, 76/37, 31

[56] References Cited

U.S. PATENT DOCUMENTS

| 2,811,874 | 11/1957 | Rethoret | 76/40 |
| 3,313,184 | 4/1967 | Granberg | 76/25 A |
| 4,104,793 | 8/1978 | Simington | 76/25 A |

*Primary Examiner*—Othell M. Simpson
*Assistant Examiner*—Roscoe V. Parker
*Attorney, Agent, or Firm*—Harvey B. Jacobson

[57] ABSTRACT

A mount is provided and includes structure for supporting a saw chain with a tooth thereof in predetermined position relative to the mount. A support is also provided and a rotary grinding wheel is journaled from the support. Parallelogram linkage structure operatively connects the support end of the mount for relative swinging thereof to bring the periphery of the grinding wheel, and said tooth, into engagement with each other along a path of relative movement extending substantially radially of the wheel and with the axis of rotation of the wheel spaced to one side of a plane in which the tooth is disposed.

9 Claims, 6 Drawing Figures

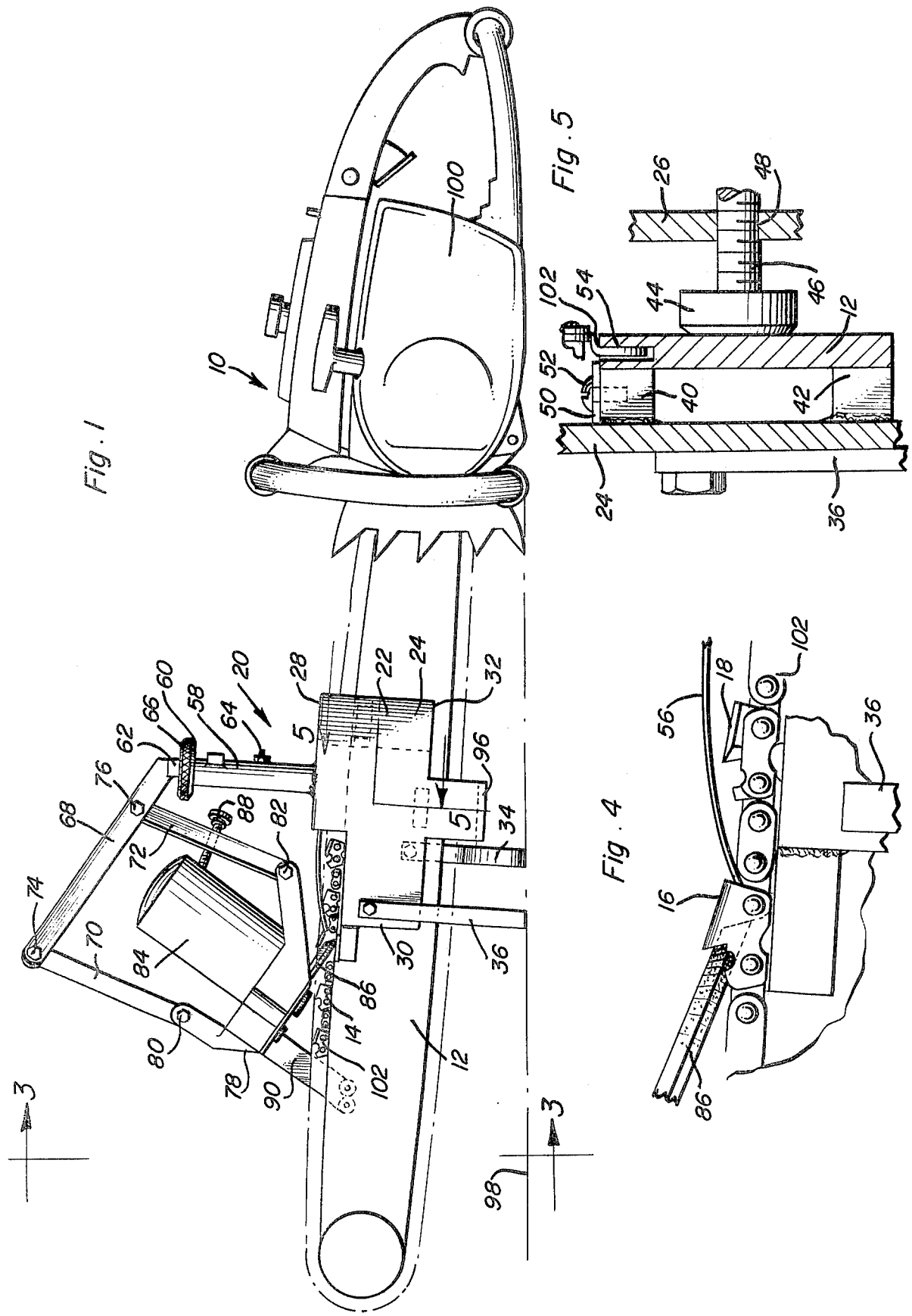

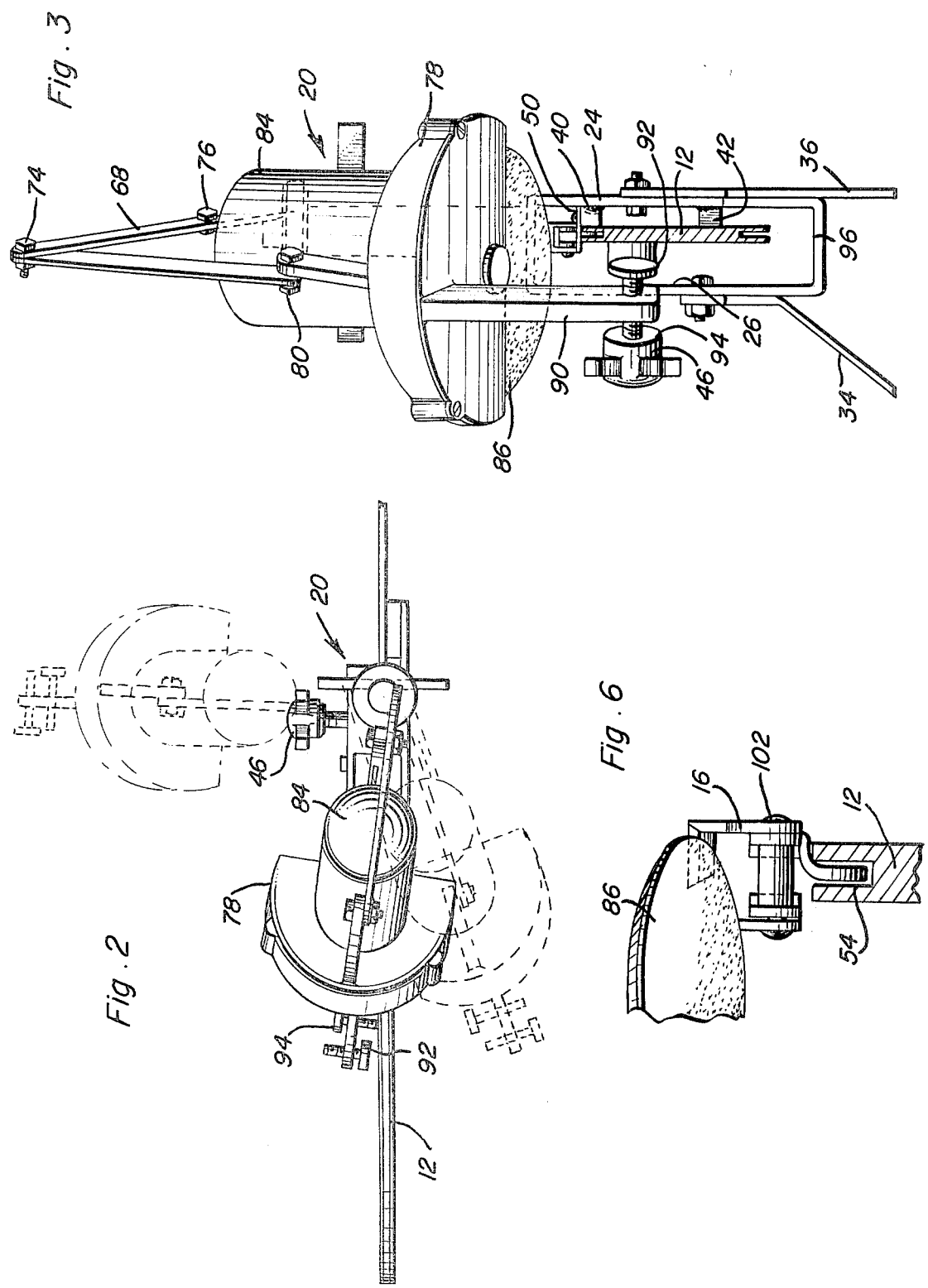

SAW MOUNTED SAW CHAIN SHARPENER

BACKGROUND OF THE INVENTION

Various forms of saw chain tooth sharpeners have been heretofore provided. Some sharpners are designed to be manually operated and other sharpeners include powered rotary grinding wheels. The previously known sharpeners incorporating powered rotary grinding wheels are often provided with saw chain support structure and rotary grinding wheel support structure including features whereby the teeth on opposite sides of an associated saw chain may be alternately sharpened. In addition, most powered rotary grinding wheel equipped saw chain tooth sharpeners include structure whereby all of the teeth on each side of the chain may be similarly sharpened.

Of those previously known forms of powered rotary grinding wheel equipped saw chain sharpeners, the sharpener disclosed in my prior U.S. Pat. No. 4,104,793, dated Aug. 8, 1978, is closest in construction and operation to the improved form of saw chain sharpener of the instant invention.

BRIEF DESCRIPTION OF THE INVENTION

The saw chain sharpener of the instant invention is constructed in a manner whereby a mount is provided for supporting a length of saw chain in predetermined position with a tooth of the saw chain specifically positioned for sharpening. A support is also provided from which a powered rotary grinding wheel is journaled and parallelogram linkage structure is operatively connected between the mount and the support for relative movement thereof along a path extending substantially radially of the grinding wheel for movement of the latter into grinding or sharpening relation with the specifically positioned chain tooth supported from the mount.

The utilization of a parallelogram linkage structure enables precise relative movement between the rotary grinding wheel and the tooth to be sharpened and the mount includes structure by which successive teeth of the chain on a given side thereof may be repeatedly disposed in the same position relative to the mount, thus enabling the rotary grinding wheel to perform the same sharpening operation on each tooth on a corresponding side of the associated chain. In addition, the chain sharpener of the instant invention is constructed in a manner whereby a simple movement of a shiftable portion of the sharpener enables the rotary grinding wheel to be brought into sharpening engagement with successive teeth on the other side of the saw chain.

The main object of this invention is to provide a saw chain sharpener which may be utilized to effectively sharpen teeth on a saw chain.

Another object of this invention is to provide a sharpener which may be utilized to effect substantially the same degree of sharpening on each tooth on a given side of the saw chain.

A further important object of this invention is to provide a sharpener which may be utilized, after sharpening all of the teeth on one side of a saw chain in substantially the same manner, to sharpen all of the teeth on the other side of the saw chain in a substantially identical manner.

Another object of this invention is to provide a chain sharpener which will be operative to sharpen the teeth of a saw chain while the chain is disposed on the bar of a chain saw.

Still another important object of this invention is to provide a chain sharpener including indexing means operative to substantially identically position the bar of a chain saw relative to the sharpener each time the teeth of the saw chain are to be sharpened.

Another very important object of this invention is to provide a chain sharpener utilizing parallelogram linkage structure for relative movement between a tooth to be sharpened and the rotary grinding wheel of the sharpener, whereby the rotary grinding wheel may be advanced in a substantially radial direction into sharpening engagement with the tooth to be sharpened.

A final object of this invention to be specifically enumerated herein is to provide a saw chain sharpener in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the chain saw sharpener of the instant invention operatively associated with the chain bar and chain of a chain saw and with the sharpener comprising a partial support for the chain saw;

FIG. 2 is a top plan view of the assemblage illustrated in FIG. 1 on somewhat of a reduced scale and with alternate positions of the rotary grinding head of the sharpener illustrated in phantom lines;

FIG. 3 is an enlarged fragmentary vertical sectional view taken substantially upon the plane indicated by the section 3—3 of FIG. 1;

FIG. 4 is an enlarged fragmentary side elevational view of the chain tooth positioning structure of the sharpener;

FIG. 5 is an enlarged fragmentary vertical sectional view taken substantially upon the plane indicated by the section line 5—5 of FIG. 1; and FIG. 6 is a fragmentary enlarged vertical sectional view taken substantially upon the plane indicated by the section line 6—6 of FIG. 4.

DESCRIPTION OF THE PREFERRED EMBODIMENTS

Referring now more specifically to the drawings, the numeral 10 generally designates a conventional form of chain saw equipped with a grooved bar 12 about which a conventional form of saw chain 14 is trained. The saw chain 14 includes alternate opposite side teeth 16 and 18 spaced longitudinally therealong and the teeth 16 and 18 must occasionally be sharpened.

The sharpener of the instant invention is referred to in general by the reference numeral 20 and includes an inverted U-shaped mount 22 including opposite side flanges 24 and 26 interconnected at their upper marginal edges by means of a horizontal bight portion 28 extending therebetween. The mount 22 includes front and rear ends 30 and 32 and the forward end portions of the flanges 24 and 26 include depending support legs 34 and 36 supported therefrom.

The inner side of the flange 24 includes upper and lower abutment bars 40 and 42 secured thereto in any convenient manner and the bar 12 of the chain saw 10 is receivable between the flanges 24 and 26 with one side of the bar 12 abutted against the abutment blocks 40 and 42 and the enlarged head 44 of a clamp screw 46 threadedly secured through a threaded bore 48 formed in the flange 26 is abutted against the opposite side of the bar 12.

The block 40 includes an indexing plate 50 removably secured to its upper surface by means of a fastener 52 and the indexing plate 50 overlies the upper margin of the adjacent portion of the bar 12 on one side of the groove 54 extending along the upper marginal edge of the bar 12.

A spring arm type tooth indexing member 56 is supported at one end from the mount 22 and is engaged with the tooth 16 at its other end to limit shifting of the tooth 16 to the right as viewed in FIG. 4 of the drawings.

The upper portion of the mount 22 includes a tubular standard 58 having a thrust collar 60 on its upper end. A circumferentially grooved lower end portion of a threaded shank 62 is rotatably journaled in the sleeve 58 and limited in axial shifting relative thereto by means of a set screw 64. An adjustable nut 66 is threaded on the upper end of the shank 62 and abuts the thrust collar 60 for adjusting the vertical height of the shank 62.

The upper end of the shank 62 is rigidly anchored relative to the lower end of an inclined arm 68 and the upper ends of a pair of parallel and oppositely inclined links 70 and 72 are pivotally supported from longitudinally spaced portions of the arm 68 as at 74 and 76. A support 78 is provided and the lower ends of the links 70 and 72 are pivotally anchored relative to the support 78 as at 80 and 82. The support mounts a motor 84 therefrom and the motor 84 includes a rotatable output shaft upon which a rotary grinding wheel 86 is mounted.

An abutment screw 88 is threadedly supported from the link 72 and is engageable with the motor 84 to limit swinging movement of the support 78 in a downward direction to the right as illustrated in FIG. 1. Also, the support 78 includes a depending support arm 90 through which adjustable abutment screws 92 and 94 are threadedly engaged for a purpose to be hereinafter more fully set forth.

In operation, the bar 12 of the saw 10 is inserted into the mount 22 from the rear end 32 thereof, the lower ends of the flanges 24 and 26 being interconnected by a lower web portion 96. After the bar 12 has been inserted into the mount to the approximate position thereof illustrated in FIG. 1, the bar 12 is raised until the upper edge portion thereof on the side of the groove 54 opposing the flange 24 abuts the underside of the indexing plate 50. Then, the screw 46 is tightened whereby the head 44 thereof will engage the side of the bar 12 remote from the flange 24 and clamp the bar 12 between the head 44 and the abutment blocks 40 and 42. After the bar 12 has thus been mounted from the mount 22, the latter may be disposed on any suitable surface, such as the surface 98 upon which the motor unit 100 of the saw 10 also rests. Thereafter, the tooth locating spring or arm 56 may have its forward end elevated and the saw chain 102 supported from the bar 12 may have its upper reach shifted rearwardly to the rights as viewed in FIG. 1 of the drawings until such time as a tooth to be sharpened approaches the forward end of the arm 56. Then, the arm 56 may be released so that the free end thereof will bear downward on the upper part of the upper reach of the chain 102 and engage the rear end of the tooth 16 in the manner illustrated in FIG. 4 of the drawings, so as to limit rearward shifting of the tooth 16.

Then, the abutment screw 92, with the arm 90 disposed on the left side of the bar 12, may be adjusted in order to engage the periphery of the grinding wheel 86 with the tooth 16 in the manner illustrated in FIG. 4 of the drawings. If it is necessary, the abutment screw 88 may also be adjusted to limit downward swinging movement of the grinding wheel 86 to the right as viewed in FIG. 1 and the nut 66 may also be adjusted, as desired. After these adjustments have been made to properly position the periphery of the grinding wheel 86 relative to the tooth 16, the abutment screw 92 may be backed out slightly.

Then, the same process is repeated with the abutment screw 94 while the arm 90 is on the right hand side of the bar 12. Thereafter, the support 78 may be shifted upwardly and to the left as viewed in FIG. 1 away from the bar 12 and the motor 84 (electric) may be actuated to effect rotation of the grinding wheel 86 at high speed. Thereafter, the support may be swung again to a position with the support arm 90 on the left side of the bar 12 and thereafter rearwardly and downwardly until the abutment screw 88 limits its rearward and downward movement. Thereafter, the support 78 is swung to the right until the abutment screw 92 engages the left side of the bar 12. In this manner, the tooth 16 will be sharpened.

After the tooth has been sharpened, the support 78 is swung to the left away from the side of the bar 12 and upwardly away from the chain 102. Then, the upper reach of the chain 102 is forwardly advanced until the next tooth on the left side of the chain 102 moves ahead of the arm 56. Thereafter, the upper reach of the chain may again be shifted rearwardly in order to abut the next left side tooth against the arm 56. When the next tooth has been properly positioned, the support 78 may be lowered to its limit position defined by the abutment screw 88 and again moved to the right until the abutment screw 92 engages the left side of the bar 12. Successive left hand teeth are sharpened in a similar manner and after all of the left hand teeth of the chain have been sharpened, the same process is repeated on the right hand side of the chain using the abutment screw 94 as a limit of movement of the support 78 toward the right hand side of the bar 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, a mount, means on said mount for supporting a saw chain in predetermined position relative to said mount, a support, a rotary grinding wheel journaled from said support, and parallelogram linkage structure operatively connecting said support and mount for relative swinging to bring the periphery of said wheel, and a saw chain tooth in predetermined position on said mount, into engagement with each other along a path extending generally radially of said wheel and with the axis of rotation of said wheel relative to said mount spaced to one side of a plane in which said tooth is disposed, said mount including structure supporting said parallelogram linkage therefrom for swinging angular displacement about an axis substantially paralleling the plane of said parallelogram linkage and extending in the same general direction as the axis of rotation of said grinding wheel.

2. The combination of claim 1 wherein said parallelogram supporting structure includes means operative to adjustably position said parallelogram supporting structure along the axis of angular displacement thereof.

3. In combination, a mount, means on said mount for supporting a saw chain in predetermined position relative to said mount, a support, a rotary grinding wheel journaled from said support, parallelogram linkage structure operatively connecting said support and mount for relative swinging to bring the periphery of said wheel, and a saw chain tooth in predetermined position on said mount, into engagement with each other with the axis of rotation of said wheel relative to said mount spaced to one side of a plane in which tooth is disposed, said mount including structure supporting said parallelogram linkage therefrom for swinging angular displacement about an axis substantially paralleling the plane of said parallelogram linkage and extending in the same general direction as the axis of rotation of said grinding wheel.

4. The combination of claim 3 wherein said mount includes a pair of rigidly interconnected generally parallel flanges and a saw chain bar clamped between said flanges in predetermined position relative thereto, said bar including a grooved edge portion for supporting a link of saw chain therefrom.

5. The combination of claim 4 wherein said mount includes short depending support legs for support of said bar closely spaced above a horizontal surface upon which the engine assembly of a chain saw including said bar may also rest.

6. A saw chain sharpener comprising a mount, said mount including structure for removable support in a predetermined position relative to a chain saw bar with the latter disposed in a predetermined plane and extending in a predetermined direction in said plane, a parallelogram linkage structure including a first base member supported from said mount for angular adjustment about an axis generally paralleling said plane and normal to said direction, a pair of parallel links having one pair of corresponding ends pivotally connected to said base member at locations spaced therealong at different radial distances of said axis, a support extending between and pivotally supported from the other ends of said links, a rotary grinding wheel journaled from said support and abutment means adjustably mounted on said support for engagement with the opposite sides of the associated bar.

7. The combination of claim 6 wherein said parallelogram linkage structure includes means for limiting swinging movement of one of said levers in one direction of swinging movement thereof.

8. The combination of claim 6 wherein said base member is swingable about said axis to positions with the planes in which said links swing relative to said base member slightly oppositely inclined relative to the first mentioned plane.

9. The combination of claim 8 wherein said mount includes saw chain tooth indexing structure operative to limit movement of a chain tooth in one direction along said path relative to the associated bar.

* * * * *